(No Model.)

L. WALDO.
VOLT-AMPERE METER.

No. 338,120. Patented Mar. 16, 1886.

Leonard Waldo,
Inventor
By atty

UNITED STATES PATENT OFFICE.

LEONARD WALDO, OF NEW HAVEN, CONNECTICUT, ASSIGNOR TO L. G. TILLOTSON & CO., OF NEW YORK, N. Y.

VOLT-AMPÈRE METER.

SPECIFICATION forming part of Letters Patent No. 338,120, dated March 16, 1886.

Application filed March 9, 1885. Serial No. 158,130. (No model.)

*To all whom it may concern:*

Be it known that I, LEONARD WALDO, of New Haven, in the county of New Haven and State of Connecticut, have invented a new Improvement in Volt-Ampère Meters; and I do hereby declare the following, when taken in connection with accompanying drawings and the letters of reference marked thereon, to be a full, clear, and exact description of the same, and which said drawings constitute part of this specification, and represent, in—

Figure 1:
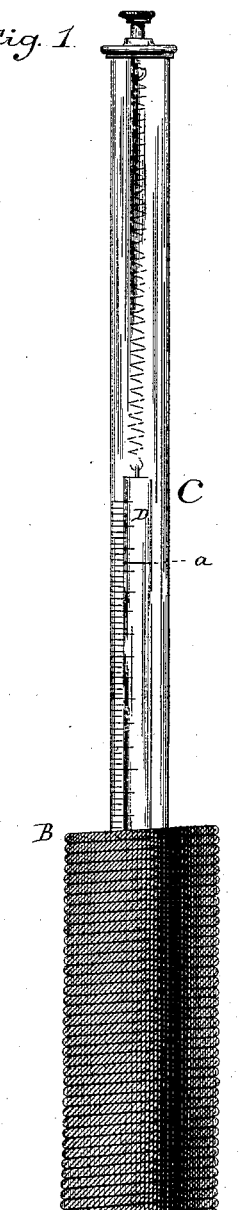
Figure 2:
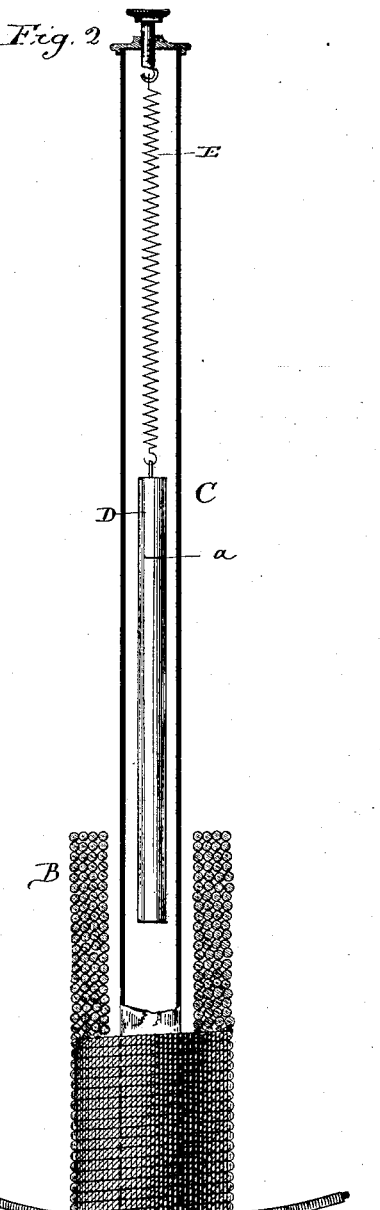

Figure 1, a side view; Fig. 2, a vertical central section.

This invention relates to an improvement in apparatus for the measurement of currents, as well as of electro-motive force, commonly called "volt-ampère meters," and particularly to such as consist of a hollow coil, through which the current passes, combined with a hollow iron cylindrical core suspended by a spring over the said coil, and so that the current through the coil will attract or draw the core into the coil, acccording to the force of such current.
As heretofore constructed, the core has been arranged within a tube having a vertical slit through its side, and through which slit a pointer fixed to the core extends, and so as to indicate the force of the current upon a graduated scale alongside the said slit. The pointer extending through the slit unavoidably works against one surface or the other, and however nicely it may be fitted is liable to inaccurately indicate the current, owing to the friction of the pointer in the slit, or working upon the surface of the scale.

The object of my invention is principally to overcome this difficulty; and it consists in a transparent glass tube arranged concentrically within the coil and supported in a vertical position, combined with a core suspended by a spring within the said glass tube, and so that in its up-and-down movement it works entirely within the glass tube, open to view, the tube and core the one provided with a graduated scale and the other with an indicating-point, whereby the extent of movement of the core will be indicated without the employment of a pointer or any projection from the core, as more fully hereinafter described.

A represents the base upon which the coil B is fixed, and through which the current is directed, as indicated; C, a transparent glass tube extending down through the coil, and preferably supported directly from the same base A.

Within the tube C is the core D, suspended by a helical or other suitable spring, E, and so as to permit the core to be drawn downward into the coil under the action of the current or in the reduction of the force of the current to be lifted therefrom by the reaction of the spring E. On the surface of the glass tube is a graduated scale, as shown, and on the core is a corresponding indicating-mark, $a$. This may be simply a mark around the core in proper relation to the scale, so as to indicate zero when no current is present.

The action upon the core is the same as in the measuring-instruments of previous construction, which I have before described, and it moves up and down within the tube, varying its position with the strength of the current and the number of convolutions of the coil, according to well-known electrical laws. By this arrangement of the core within the tube it is left entirely free without contact with surrounding surfaces, and is substantially protected from outward influences which may interfere with its proper working.

The scale may be on the core and the indicating-mark on the tube, the movement of the core being indicated alike in either case.

I claim—

The combination of the hollow coil B, the transparent glass tube C, through the solid transparent wall of which the core is exposed—that is, without vertical slit or opening therein—arranged concentrically within said coil and extending above it, and the core D, suspended within said tube by a spring, E, the said glass and core the one provided with a graduated scale and the other with an indicator-mark, whereby the extent of movement of the said core may be determined, substantially as described.

LEONARD WALDO.

Witnesses:
JOHN E. EARLE,
JOS. C. EARLE.